Apr. 3, 1923.
W. D. OTT ET AL
AUTOMOBILE HEADLIGHT
Filed Mar. 25, 1921
1,450,642
2 sheets-sheet 1
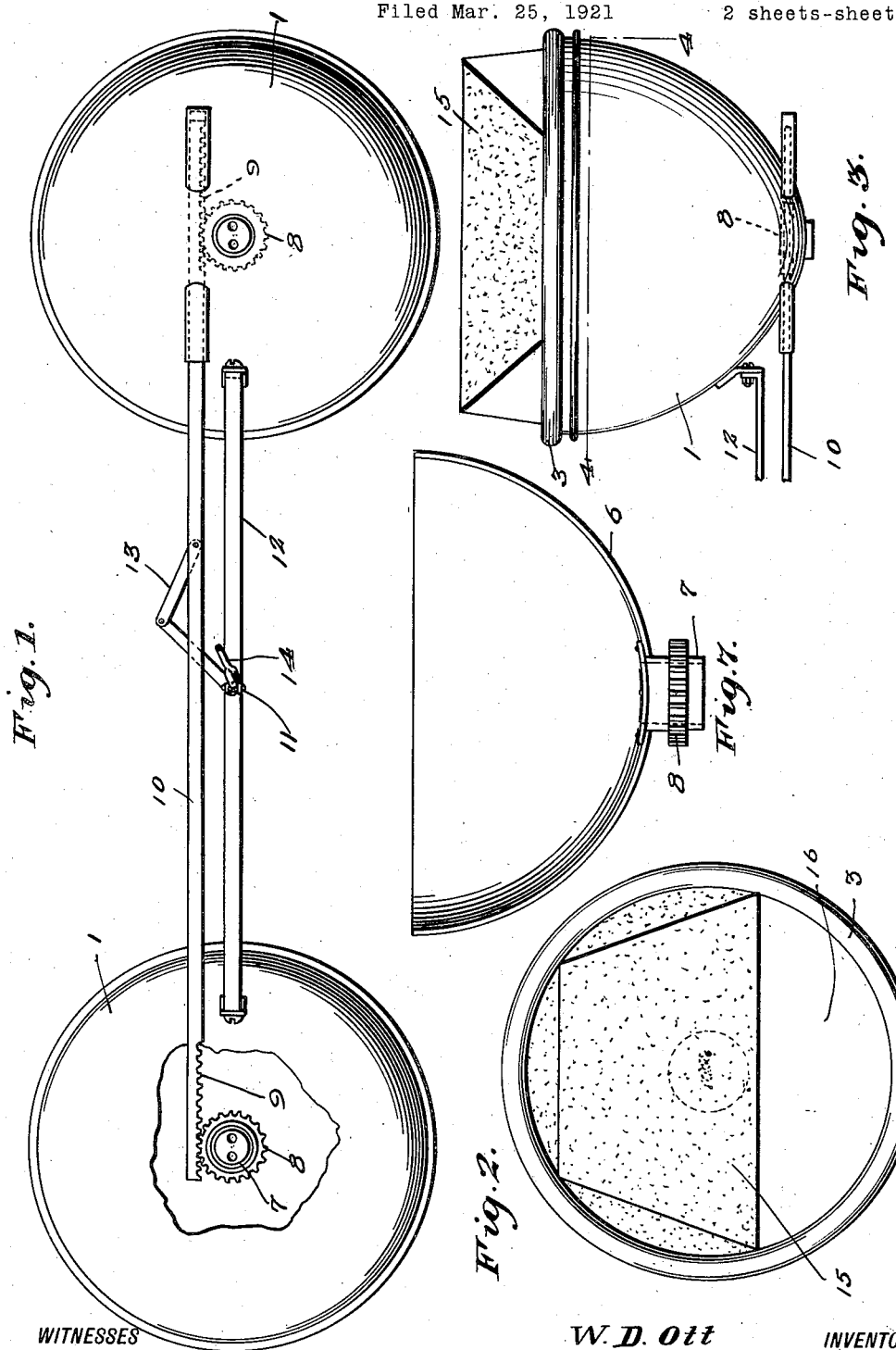
WITNESSES
R. Q. Thomas
W. D. Ott
H. F. Griffin
INVENTORS
BY
Munn & Co.
ATTORNEYS Apr. 3, 1923.  
W. D. OTT ET AL  
AUTOMOBILE HEADLIGHT  
Filed Mar. 25, 1921
1,450,642
2 sheets-sheet 2
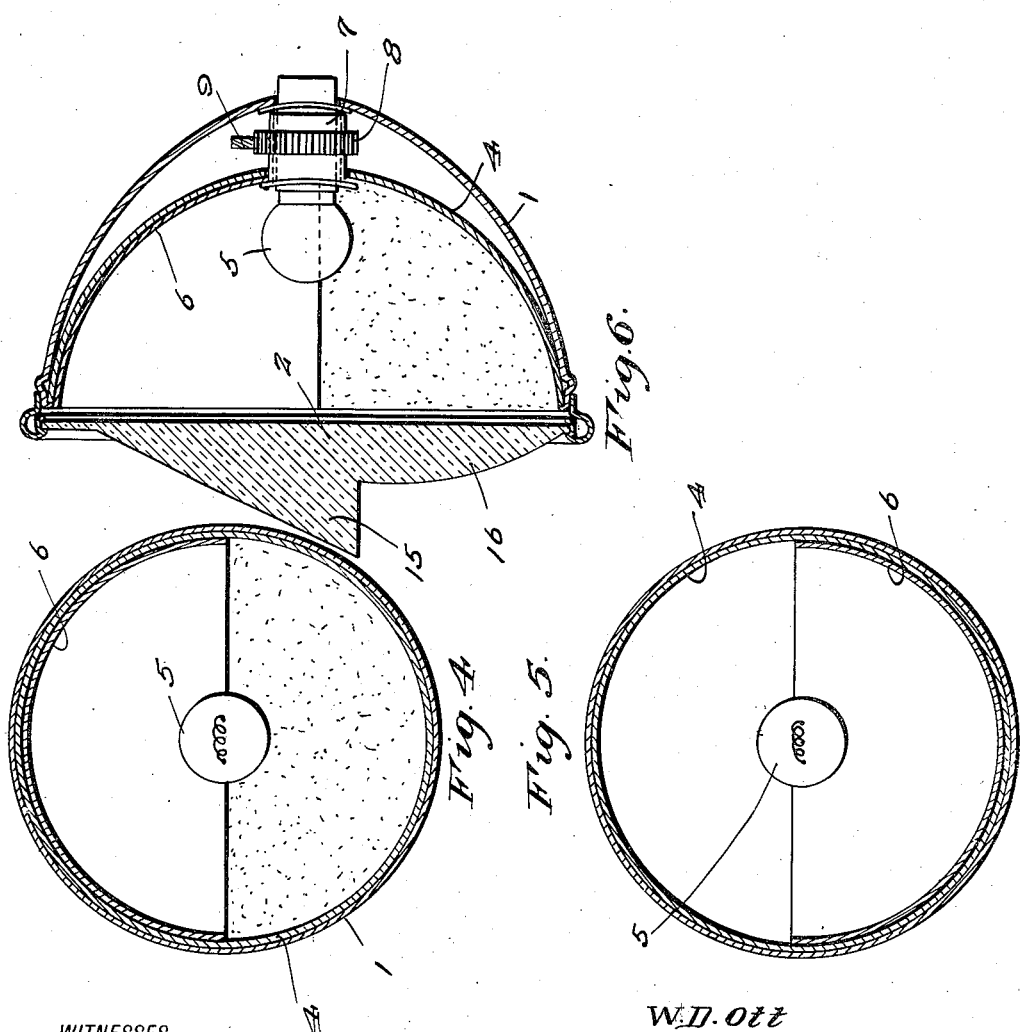

Patented Apr. 3, 1923.

1,450,642

UNITED STATES PATENT OFFICE.

WILLIAM D. OTT AND HENRY FRANCIS GRIFFIN, OF RIVERSIDE, IOWA.

AUTOMOBILE HEADLIGHT.

Application filed March 25, 1921. Serial No. 455.586.

*To all whom it may concern:*

Be it known that we, WILLIAM D. OTT and HENRY F. GRIFFIN, citizens of the United States, and residents of Riverside, in the county of Washington and State of Iowa, have invented certain new and useful Improvements in Automobile Headlights, of which the following is a specification.

Our invention relates to vehicle headlights, particularly designed for use on automobiles.

The object of the invention is to provide a unitary headlight which will divide the light energy emitted by the illuminant and project it in a plurality of distinct spaces with reference to the vehicle on which the light is mounted, for the purpose of differentiating the illuminated spaces in accordance with the effects desired. To this end, we provide a headlight which projects a relatively dim beam in the space which normally includes the eyes of pedestrians or occupants of other cars, a brighter beam which intersects and illuminates the ground a required distance in front of the car and a third beam which illuminates the roadway directly in front of the car. Our headlight, therefore, while brightly illuminating the roadway, will not produce those blinding effects which have heretofore been such a fruitful source of accidents.

More particular objects of the invention will become apparent as the description proceeds.

Referring to the accompanying drawings, Figure 1 is a rear view of a pair of headlights, showing operating means for varying the brightness of the projected beams.

Figure 2 is a front elevation of one of the lights.

Figure 3 is a plan view thereof.

Figures 4 and 5 are transverse vertical sections through the light showing the movable reflector in different positions.

Figure 6 is a vertical longitudinal section, and

Figure 7 is a detail view illustrating the movable reflector.

The headlights are adapted to be supported on the running boards, or other suitable locations, in any preferred way. Each headlight comprises a suitable casing 1, a lens 2 supported in a ring 3, which is attached in any suitable manner to the front of the casing, a reflector 4 and an illuminant 5, which may be an electric incandescent lamp. In addition to the reflector 4, which may be a metallic reflector of spherical or parabolic form, we provide a movable reflector 6 of corresponding form, which is adapted to be manually controlled so as to cover the upper or lower half of reflector 4, at the will of the operator, for a purpose to be disclosed presently. Reflector 6 is attached to a sleeve 7 which surrounds the stem of the lamp and is rotatable thereon in a central aperture of reflector 4. Attached to sleeve 7 is a pinion 8 which meshes with a rack 9 passing through aligned apertures in the rear of the casing and slidably supported in bearings attached thereto. As clearly shown in Figure 1, the racks 9 for the two lamps are connected by a rod 10, which is operated by a knuckle 11, supported on a stationary bar 12, and connected with the bar 10 by a link 13, the knuckle 11, being actuated by a link 14 connected with mechanism under the control of the driver.

As heretofore stated, the projecting lens which we employ is adapted to differentiate a plurality of illuminated zones or spaces to the end that blinding effects may be prevented and the light directed where needed. For this purpose, we provide a lens of the form indicated in Figures 2, 3 and 6. As shown, the lens consists of an upper and lower part formed respectively of a base-down prism 15 and a condenser 16. The prism as shown is a single prism presenting a quadrilateral front face sloping downwardly and forwardly, and triangular side faces sloping downwardly and laterally. The prism preferably extends a substantial distance below the horizontal plane passing through the light emitted, or filament, thereby rendering it impracticable for the bright beam projected by the condenser to be thrown in the eyes of a pedestrian or driver of another car.

For the purpose of further diffusing the upper light beam, we may form the outer face of the prism as a ground surface so as to bend the light rays and diffuse them in a more or less indefinite beam, thereby to produce still softer effects.

An auxiliary feature of our invention consists in providing means for controlling at will the relative brightness of the road-illuminating beam according to the exigencies of the particular situation. For example, when running on city streets at low speed it is desirable that this beam be less bright than when running at a high speed on country roads, where a more distant view of the road is required. For effecting this desirable result, we color the lower half of the reflector 4, preferably green, and arrange the movable reflector 6, so as to cover or uncover this colored part at the will of the driver by the mechanism already described. It is obvious that when the reflector occupies its upper position, as shown in Figures 4 and 6, only those rays will be reflected which lie in the green portion of the spectrum, whereas when the reflector is in its lower position, substantially all of the rays will be reflected. It therefore follows that the operator can project at will a bright white beam of relatively great power or a softer tinted beam.

Having described our invention with sufficient fullness and particularity to enable those skilled in the art to practice the same, what we claim as new and desire to secure by Letters Patent is:—

1. A vehicle headlight adapted to be supported on the vehicle, and consisting of a casing, a stationary reflector supported in said casing, a lamp having a stem supported by said casing and reflector, a sleeve rotatably mounted on said stem and having a pinion attached thereto, a rack slidably mounted in said casing and engaging said pinion, a movable reflector section rotatable in front of said stationary reflector and adapted to cover the upper or lower portion thereof, said stationary reflector having its lower portion tinted, said movable reflector being attached to said sleeve, a lens supported at the front of said casing and having its upper part formed as a base-down prism and its lower part formed as a condenser, and manually controlled means for operating said rack.

2. A vehicle headlight comprising a casing, a stationary reflector supported in said casing, a movable reflector section rotatable in front of said stationary reflector and adapted to cover the upper or the lower portion thereof, said stationary reflector having its lower portion tinted, a lens supported at the front of said casing and having its upper part formed as a base-down single prism, and its lower part formed as a condenser, said prism presenting a quadrilateral front face sloping downwardly and forwardly and triangular side faces sloping downwardly and laterally, the outer surface of said prism being ground for the purpose of diffusing the light.

3. A headlight comprising a casing, a stationary reflector supported in said casing and spaced from the rear wall thereof, said casing and reflector having central aligned apertures therein, a lamp having a stem supported in said apertures, a sleeve rotatable on said stem and having a pinion thereon in the space between said reflector and casing, a rack slidably mounted in said casing and engaging said pinion, manually controlled means for operating said rack, a movable reflector attached to said sleeve, rotatable in said stationary reflector and adapted to cover the upper or the lower portions thereof, the lower portion of said stationary reflector being tinted, and a lens supported at the front of said casings, said lens having its upper part formed as a base-down prism, and its lower part formed as a condenser, the outer surface of said prism being ground for the purpose of diffusing the light.

WILLIAM D. OTT.
HENRY FRANCIS GRIFFIN.